(12) United States Patent
Cheng et al.

(10) Patent No.: US 7,701,717 B2
(45) Date of Patent: Apr. 20, 2010

(54) NOTEBOOK COMPUTER HAVING HEAT PIPE

(75) Inventors: Nien-Tien Cheng, Taipei Hsien (TW); Yung-Fa Cheng, Taipei Hsien (TW); Rung-An Chen, Taipei Hsien (TW); Cheng-Jen Liang, Taipei Hsien (TW); Ching-Bai Hwang, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/169,639

(22) Filed: Jul. 9, 2008

(65) Prior Publication Data

US 2009/0268392 A1 Oct. 29, 2009

(30) Foreign Application Priority Data

Apr. 23, 2008 (CN) .................. 2008 1 0066775

(51) Int. Cl.
*H05K 7/20* (2006.01)
(52) U.S. Cl. ............. 361/700; 361/679.47; 361/679.52; 361/679.53; 174/15.2; 165/80.4; 165/104.26; 165/104.33

(58) Field of Classification Search ................ None
See application file for complete search history.

(56) References Cited

U.S. PATENT DOCUMENTS

| | | | | |
|---|---|---|---|---|
| 6,215,657 B1 * | 4/2001 | Bhatia | .................... | 361/679.52 |
| 6,226,178 B1 * | 5/2001 | Broder et al. | .......... | 361/679.52 |
| 6,239,390 B1 * | 5/2001 | Fukui et al. | ................. | 200/5 A |
| 6,357,515 B1 * | 3/2002 | Bhatia | ....................... | 165/80.3 |
| 6,430,042 B1 * | 8/2002 | Ohashi et al. | .......... | 361/679.49 |
| 6,900,984 B2 * | 5/2005 | Merz et al. | ............. | 361/679.55 |
| 7,457,111 B2 * | 11/2008 | Merz et al. | ............. | 361/679.33 |

* cited by examiner

*Primary Examiner*—Boris L Chervinsky
(74) *Attorney, Agent, or Firm*—Frank R. Niranjan

(57) ABSTRACT

A notebook computer includes a heat-generating component, a keyboard frame made of a heat conductive material and a heat pipe having an evaporator and a condenser. The evaporator of the heat pipe is in thermal communication with the heat-generating component and the condenser is attached to the keyboard frame and away from the heat-generating component.

8 Claims, 5 Drawing Sheets

NOTEBOOK COMPUTER HAVING HEAT PIPE

BACKGROUND

1. Technical Field

The present invention generally relates to a notebook computer, and more particularly to a notebook computer having a heat pipe coupled to a keyboard frame of the notebook computer for dissipating thermal energy within the notebook computer.

2. Description of Related Art

Successive new models of mobile computers, such as notebook computers, are continuing to shrink in size and become lighter, smaller and thinner. In addition, with the improvement of the functionality of the notebook computers, electrical power consumed by many of these notebook computers continues to increase. Thus, heat generated from microprocessors, disk drives, power supplies and other components of the notebook computers is often increased.

However, the notebook computers generally do not have heat dissipation devices having relative small size and high efficiency of heat dissipation. When the notebook computers operate for a relative long period of time, the notebook computers become very hot and tend to fail more often than cooler notebook computers.

Furthermore, since the notebook computers are continuing to shrink in size and become thinner, a distance between a heat-generating component within a notebook computer and a shell of the notebook computer becomes smaller and smaller, heat generated from the heat-generating component tends to heat up the shell, particularly a bottom wall of the shell around the heat-generating component, to a temperature beyond a safe threshold level. When the notebook computer becomes too hot, not only is it uncomfortable for the user, but concerns are expressed about possible safety and fire hazards.

SUMMARY

An exemplary embodiment of the present invention provides a notebook computer. The notebook computer includes a heat-generating component, a keyboard frame made of a heat conductive material and a heat pipe having an evaporator and a condenser. The evaporator of the heat pipe is in thermal communication with the heat-generating component and the condenser is attached to the keyboard frame and away from the heat-generating component.

Other advantages and novel features of the present invention will become more apparent from the following detailed description of embodiments when taken in conjunction with the accompanying drawings.

DETAILED DESCRIPTION

Figure 1:
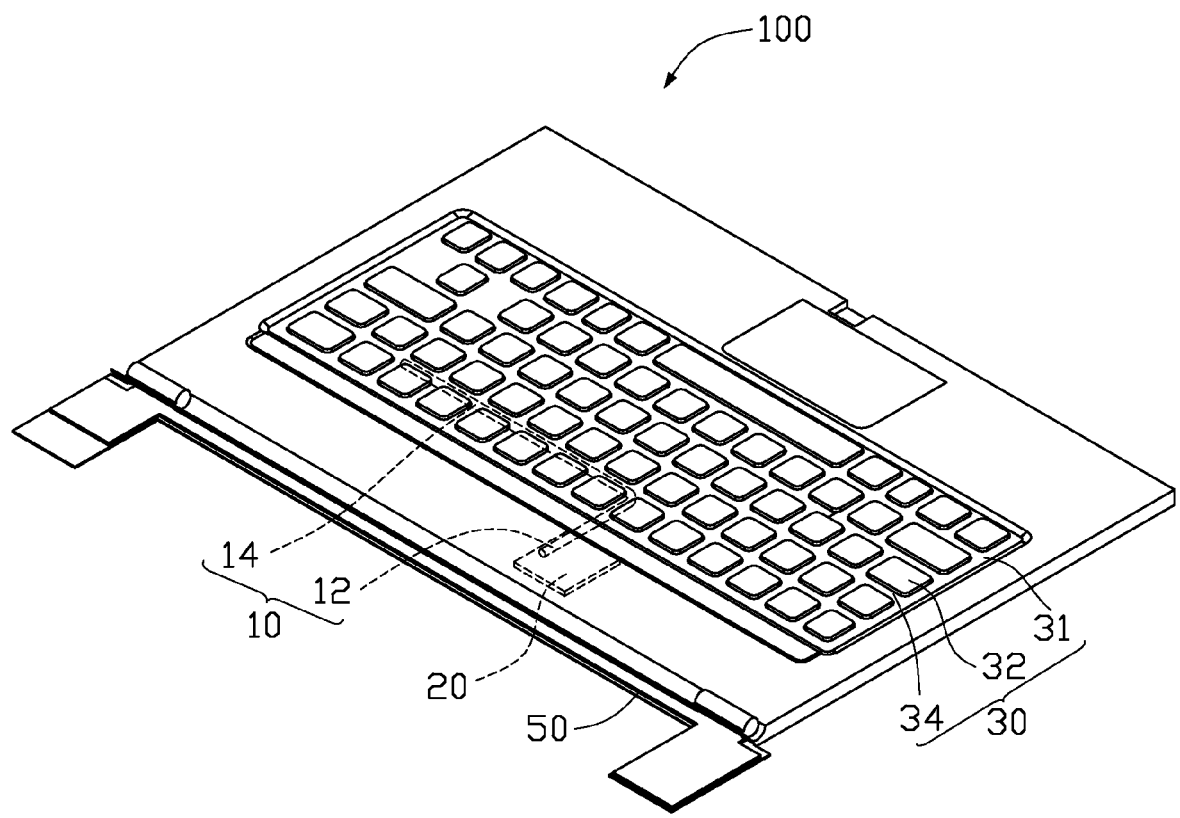
FIG. 1 is an isometric view of a notebook computer in accordance with a first embodiment of the present invention.

Reference will now be made to the drawing figures to describe the embodiments in detail.

Figure 2:
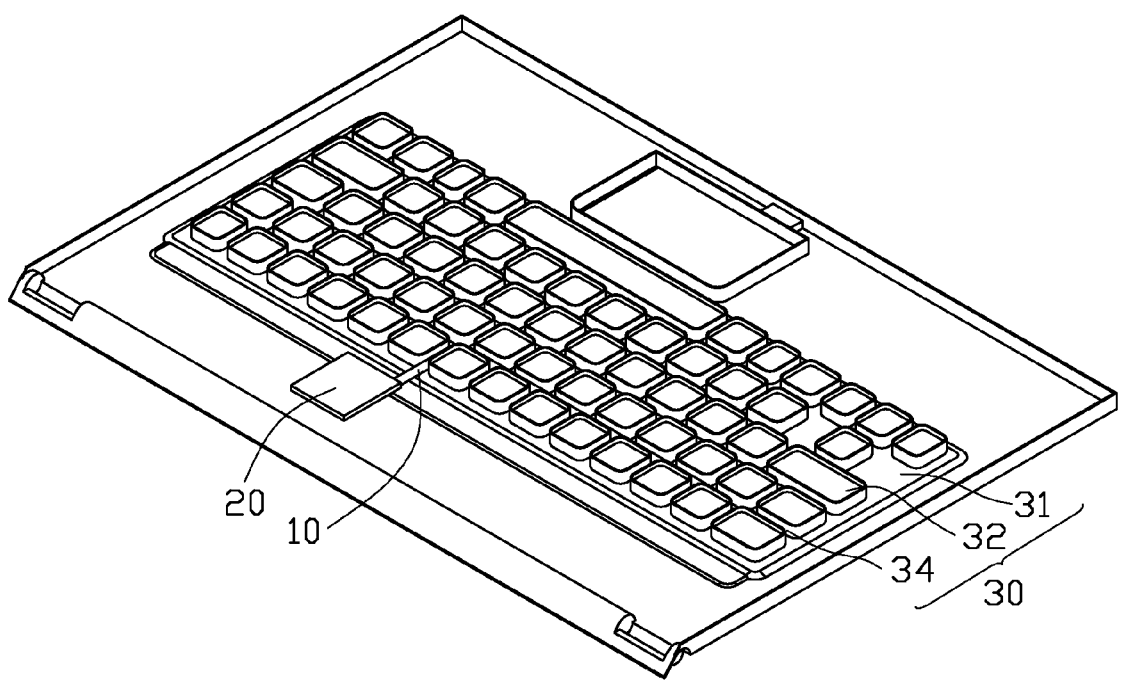
FIG. 2 is an isometric view of the notebook computer of FIG. 1, which is viewed from a bottom side with a bottom board of the notebook computer being removed away.

Referring to FIGS. 1-2, a notebook computer 100 in accordance with a first embodiment of the present invention is illustrated. The notebook computer 100 comprises a bottom board 50, a keyboard frame 30 covered on the bottom board 50 to form an enclosure, a heat-generating component 20 located within the enclosure, and a heat pipe 10. In the embodiment, a display unit of the notebook computer 100 is not shown for the purpose of clarity. The heat pipe 10 thermally connects the heat-generating component 20 to the keyboard frame 30.

The keyboard frame 30 includes a base 31 and a plurality of keys 32 arrayed in the base 31 in rows and columns. The base 31 is a rectangular and substantially planar board, which is made of a heat conductive material such as copper or aluminum. The keys 32 extend through the base 31 from a top surface to a bottom surface of the base 31. A long and narrow channel 34 is defined between neighboring rows of keys 32 for installing the heat pipe 10.

The heat pipe 10 is L-shaped and mounted on a bottom surface of the base 31 via soldering, adhering or other conventional methods. The heat pipe 10 has an evaporator 12 and a condenser 14 perpendicularly extending from the evaporator 12. The evaporator 12 directly contacts with the heat-generating component 20 to absorb heat produced by the heat-generating component 20. The condenser 14 extends in the channel 34 defined between neighboring rows of keys 32 to spread the heat absorbed by the evaporator 12 onto the whole base 31. Then, the heat absorbed by the evaporator 12 is dissipated to ambient air through the larger surface of the base 31. In other words, the heat pipe 10 and the base 31 together form a heat dissipation device for cooling the heat-generating component 20.

As described above, the heat produced by the heat-generating component 20 can be quickly transferred away to the base 31 via phase transformation of working fluid contained in the heat pipe 10. Therefore, the heat-generating component 20 can work within an acceptable temperature range. Since the heat pipe 10 has a high heat transfer performance with a small volume and the base 31 is substantially planar and thinner, the heat dissipation device formed by the heat pipe 10 and the base 31 has a small height and is suitable for dissipating thermal energy within the notebook computer 100 having a compact size.

Furthermore, since the heat produced by the heat-generating component 20 is transferred away to the base 31, the heat-generating component 20 has a relative low temperature. Thus, the bottom board 50, particularly the portion of the bottom board 50 around the heat-generating component 20, has a relative low temperature, and the aforementioned problems in the conventional notebook computer are solved or at least mitigated.

Figure 3:
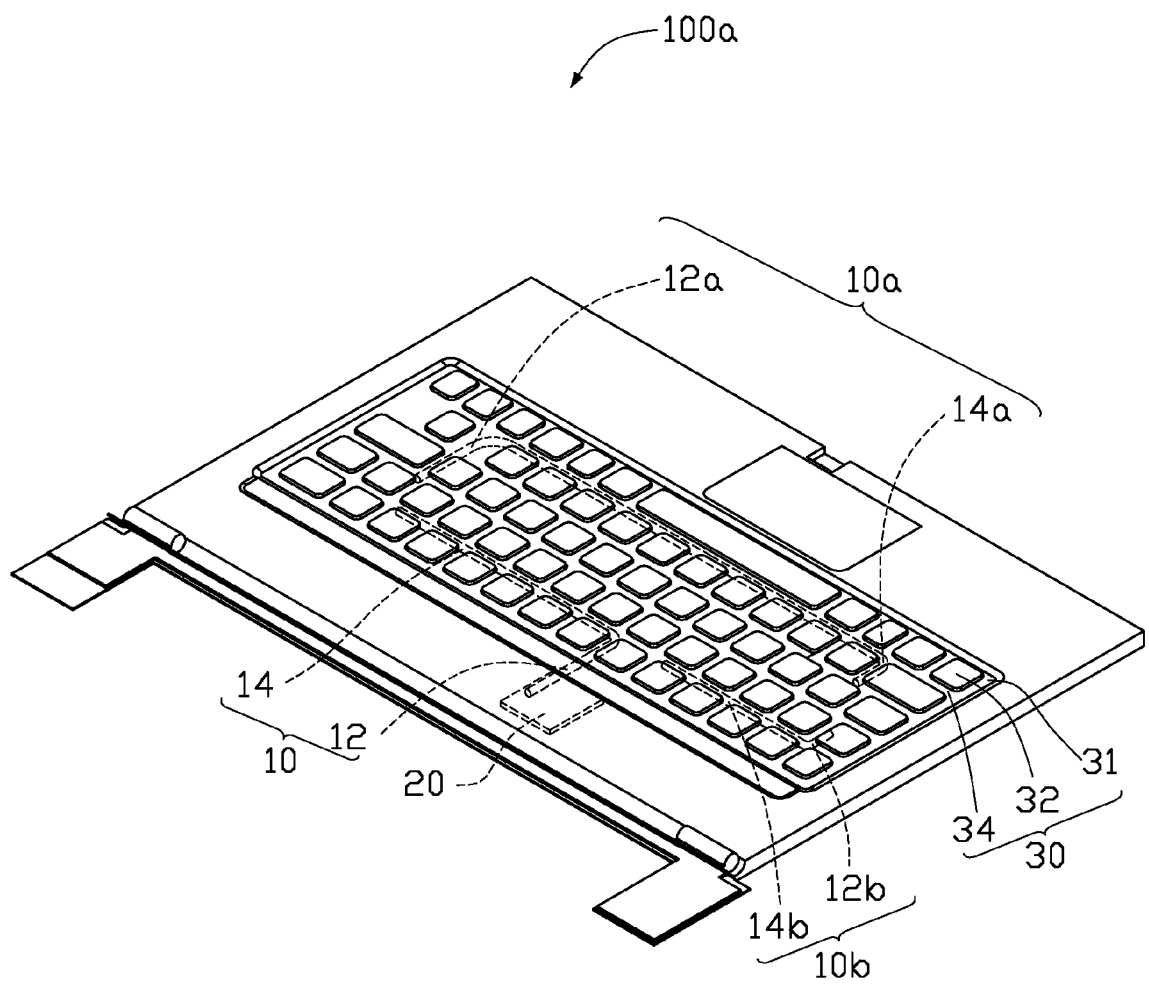
FIG. 3 is an isometric view of a notebook computer in accordance with a second embodiment of the present invention.

Referring to FIG. 3, a notebook computer 100a in accordance with a second embodiment of the present invention is illustrated. The difference between the notebook computer 100a and the notebook computer 100 is that the notebook computer 100a further comprises two heat-spreading heat pipes 10a, 10b (shown in dashed lines). The two heat-spreading heat pipes 10a, 10b are attached on the bottom surface of the base 31 and extend in the channels 34 between the neighboring rows of keys 32.

The heat-spreading heat pipe 10a comprises a first end 12a arranged adjacent to the condenser 14 of the heat pipe 10, and a second end 14a extending from the first end 12a. The heat-spreading heat pipe 10b comprises a first end 12b arranged adjacent to the second end 14a of the heat-spreading heat pipe 10a, and a second end 14b extending toward the evaporator 12 of the heat pipe 10. In other words, the heat pipe 10 and the two heat-spreading heat pipes 10a, 10b are arranged end-to-end to form substantially a loop. By such a design, the heat produced by the heat-generating component 20 is transferred to the base 31 via the heat pipe 10, and then the heat is quickly spread at the whole base 31 via the two heat-spreading heat pipes 10a, 10b. This accelerates dissipation of the heat accumulated at the base 31.

Figure 4:
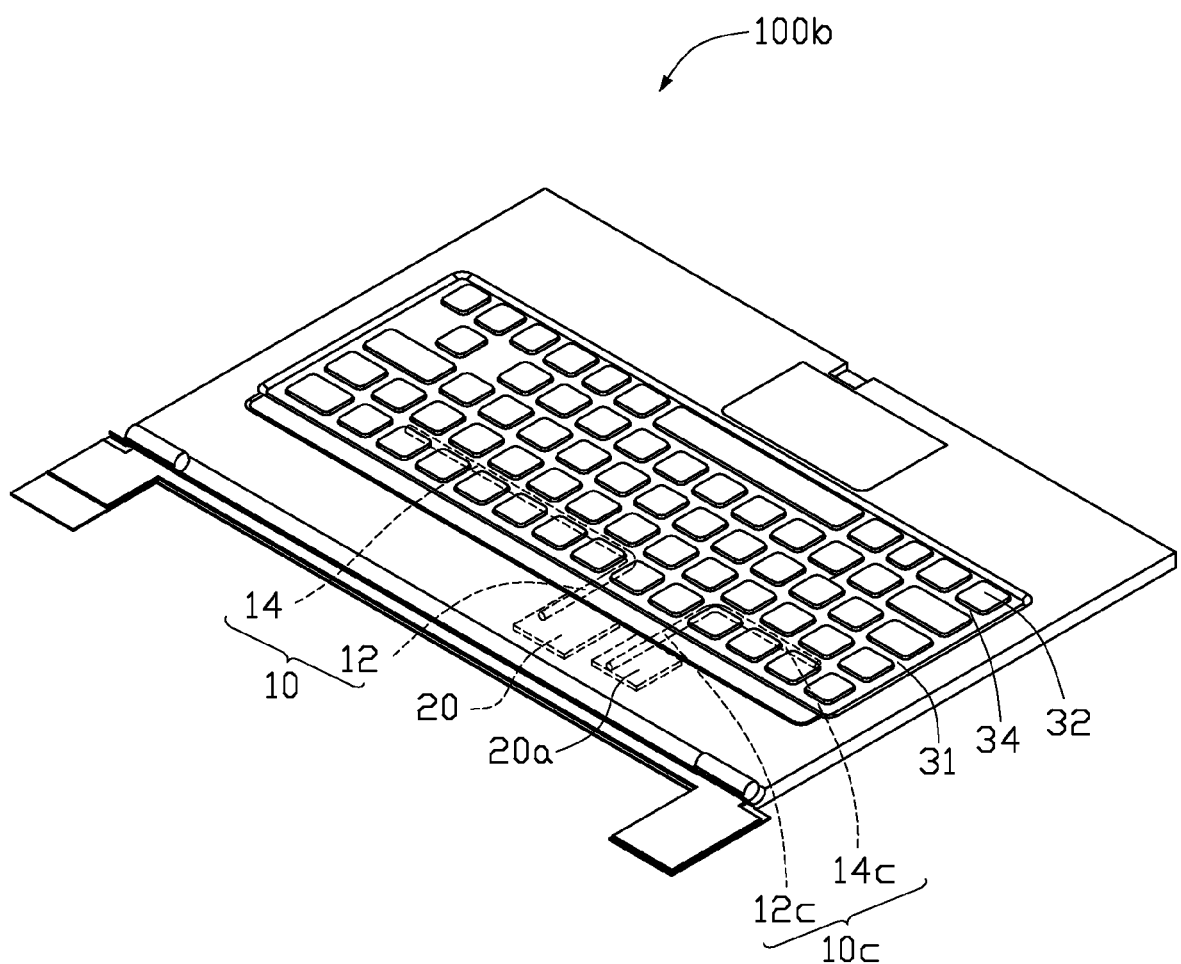
FIG. 4 is an isometric view of a notebook computer in accordance with a third embodiment of the present invention.

Referring to FIG. 4, a notebook computer 100b in accordance with a third embodiment of the present invention is illustrated. The difference between the notebook computer 100b and the notebook computer 100 is that the notebook computer 100b further comprises another heat-generating component 20a (shown in dashed lines) and an another heat pipe 10c (shown in dashed lines). The another heat pipe 10c is L-shaped and attached to the bottom surface of the base 31. The another heat pipe 10c comprises an evaporator 12c directly contacting with the another heat-generating component 20a, and a condenser 14c extending in the channel 34 defined between neighboring rows of keys 32. Preferably, the condenser 14c extends in a direction opposite to that of the condenser 14 of the heat pipe 10 so that heat produced by the heat-generating component 20 and the another heat-generating component 20a is uniformly spread at the base 31. This helps to make full use of the base 31 to dissipate heat.

Figure 5:
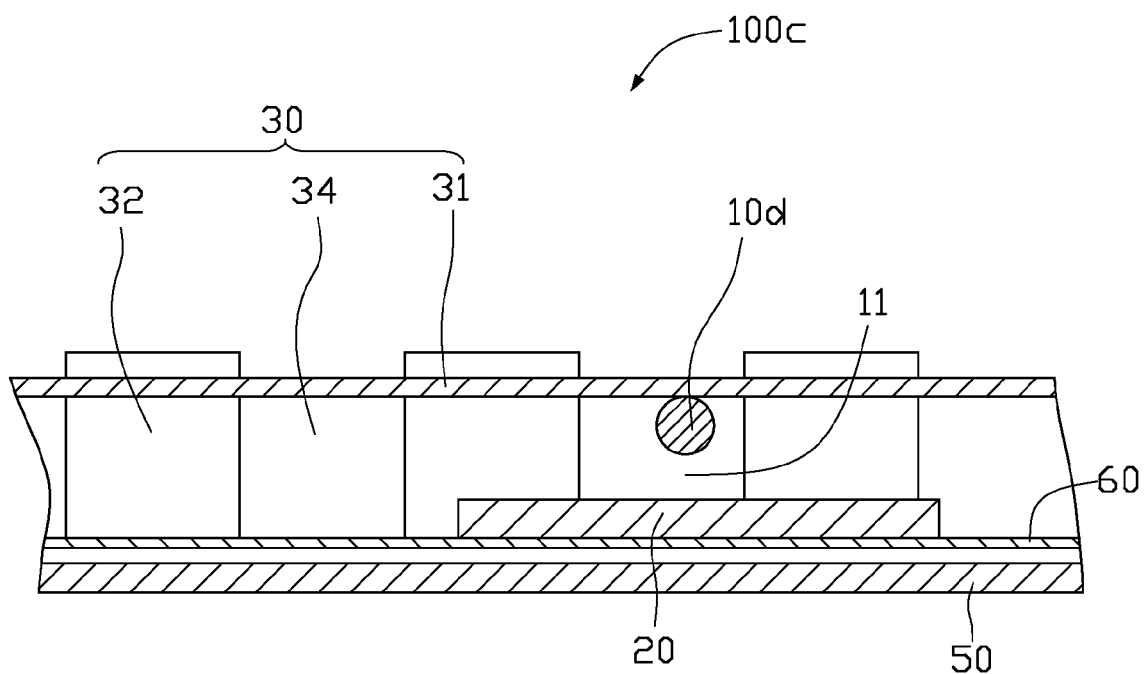
FIG. 5 is a side cross-section view of a notebook computer in accordance with a forth embodiment of the present invention.

Referring to FIG. 5, a notebook computer 100c in accordance with a forth embodiment of the present invention is illustrated. The difference between the notebook computer 100c and the notebook computer 100 is that the notebook computer 100c further comprises an air-heating heat pipe 10d, which has an evaporator disposed above and does not contact with the heat-generating component 20 mounted on a printed circuit board 60. A small distance 11 is defined between the evaporator of the air-heating heat pipe 10d and the heat-generating component 20.

The air-heating heat pipe 10d further comprises a condenser (not shown) extending in the channel 34 in a manner similar to that of the condenser 14 as described above.

The heat pipe 10 of the first embodiment is not shown and only the different part, i.e., the air-heating heat pipe 10d is illustrated. The air-heating pipe 10d has a size smaller than that of the heat pipe 10 so that the evaporator 12 of the heat pipe 10 and the evaporator of the air-heating heat pipe 10d thermally connect with the heat-generating component 20 in different manners.

Since the distance 11 between the evaporator of the air-heating heat pipe 10d and the heat-generating component 20 is small, heat produced by the heat-generating component 20 heats up the air therebetween and the heated air conducts heat to the evaporator of the air-heating heat pipe 10d. In other words, the evaporator of the air-heating heat pipe 10d indirectly thermally contacts with the heat-generating component 20. By the presence of the air-heating heat pipe 10d, the heat produced by the heat-generating component 20 is indirectly absorbed by the air-heating heat pipe 10d.

In addition, other heat-generating components within the notebook computer 100c also produce a lot of heat, which leads to an increase of the internal temperature of the notebook computer 100c. The air-heating heat pipe 10d can greatly reduce the internal temperature of the notebook computer 100c. Preferably, the air-heating heat pipe 10d can be designed to have an operating temperature range lower than that of the heat pipe 10, which directly contacts with the heat-generating component 20. In other words, the air-heating heat pipe 10d can be used to transfer heat by means of the phase transition of the working fluid therein under a temperature range lower than that of the heat pipe 10. Thus, the internal temperature of the notebook computer 100c can be quickly and greatly reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A notebook computer comprising:
a heat-generating component;
a keyboard frame made of a heat conductive material and having a plurality of keys mounted thereon;
a heat pipe having an evaporator and a condenser; and
at least one heat-spreading heat pipe;
wherein the evaporator is in thermal communication with the heat-generating component and the condenser is attached to the keyboard frame and away from the heat-generating component;
wherein the evaporator directly contacts with the heat-generating component;
wherein the keyboard frame includes a base and the plurality of keys is arrayed in the base in rows and columns, the keys extending through the base from a top surface to a bottom surface of the base with a plurality of long and narrow channels each being defined between two neighboring rows of the keys, the condenser being attached to the bottom surface of the base and extending in at least one of the channels; and
wherein the at least one heat-spreading heat pipe is attached to the bottom surface of the base, the at least one heat-spreading heat pipe extending in the channels, the heat pipe and the at least one heat-spreading heat pipe together forming a loop.

2. The notebook computer of claim 1, wherein the at least one heat-spreading heat pipe comprises two heat-spreading heat pipes, the heat pipe and the two heat-spreading heat pipes are arranged end-to-end to form a loop.

3. A notebook computer comprising:
a heat-generating component;
a keyboard frame having a plurality of keys mounted thereon; and
a first heat pipe having an evaporator and a condenser extending from the evaporator; and
a second heat pipe having an evaporator and a condenser extending from the evaporator of the second heat pipe;
wherein the evaporator of the first heat pipe physically contacts with the heat-generating component and the evaporator of the second heat pipe is located near the heat-generating component and spaces a distance therefrom; and
wherein at least one of the condensers of the first heat pipe and the second heat pipe is attached to the keyboard frame.

4. The notebook computer of claim 3, wherein the second heat pipe has an operating temperature range lower than that of the first heat pipe.

5. The notebook computer of claim 4, wherein the keyboard frame includes a base and the plurality of keys is arrayed in the base in rows and columns, the keys extending through the base from a top surface to a bottom surface of the base with a plurality of long and narrow channels each defined between two neighboring rows of the keys, the at least one of the condensers of the first heat pipe and the second heat pipe being attached to the bottom surface of the base and extending in at least one of the channels.

6. A notebook computer comprising:

a heat-generating component;

a keyboard frame made of a heat conductive material and having a plurality of keys mounted thereon;

a heat pipe having an evaporator and a condenser; and an air-heating heat pipe which absorbs heat from internal air within the notebook computer;

wherein the evaporator is in thermal communication with the heat-generating component and the condenser is attached to the keyboard frame and away from the heat-generating component;

wherein the evaporator directly contacts with the heat-generating component;

wherein the keyboard frame includes a base and the plurality of keys is arrayed in the base in rows and columns, the keys extending through the base from a top surface to a bottom surface of the base with a plurality of long and narrow channels each being defined between two neighboring rows of the keys, the condenser being attached to the bottom surface of the base and extending in at least one of the channels; and wherein the air-heating heat pipe has an evaporator disposed above and close to the heat-generating component with a distance defined therebetween.

7. The notebook computer of claim 6, wherein the air-heating heat pipe has a condenser extending in at least one of the channels.

8. The notebook computer of claim 6, wherein the air-heating heat pipe has an operating temperature range lower than that of the heat pipe.

* * * * *